Nov. 29, 1960  R. ÁVILA  2,962,234
GRATING AND SHREDDING MACHINE
Filed July 29, 1957  2 Sheets-Sheet 1
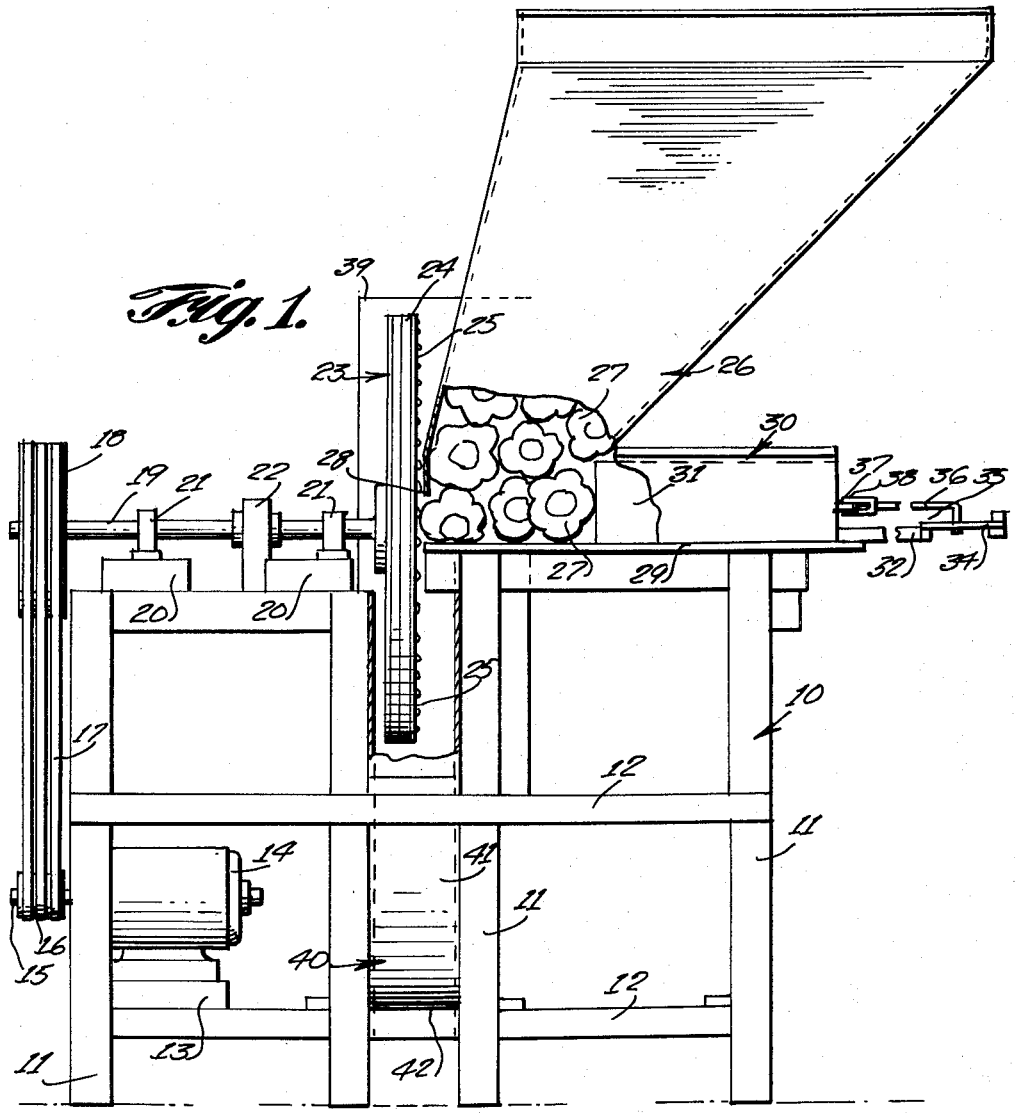
INVENTOR.
Ramón Ávila
BY Victor J. Evans & Co.
ATTORNEYS Nov. 29, 1960   R. ÁVILA   2,962,234
GRATING AND SHREDDING MACHINE
Filed July 29, 1957   2 Sheets-Sheet 2
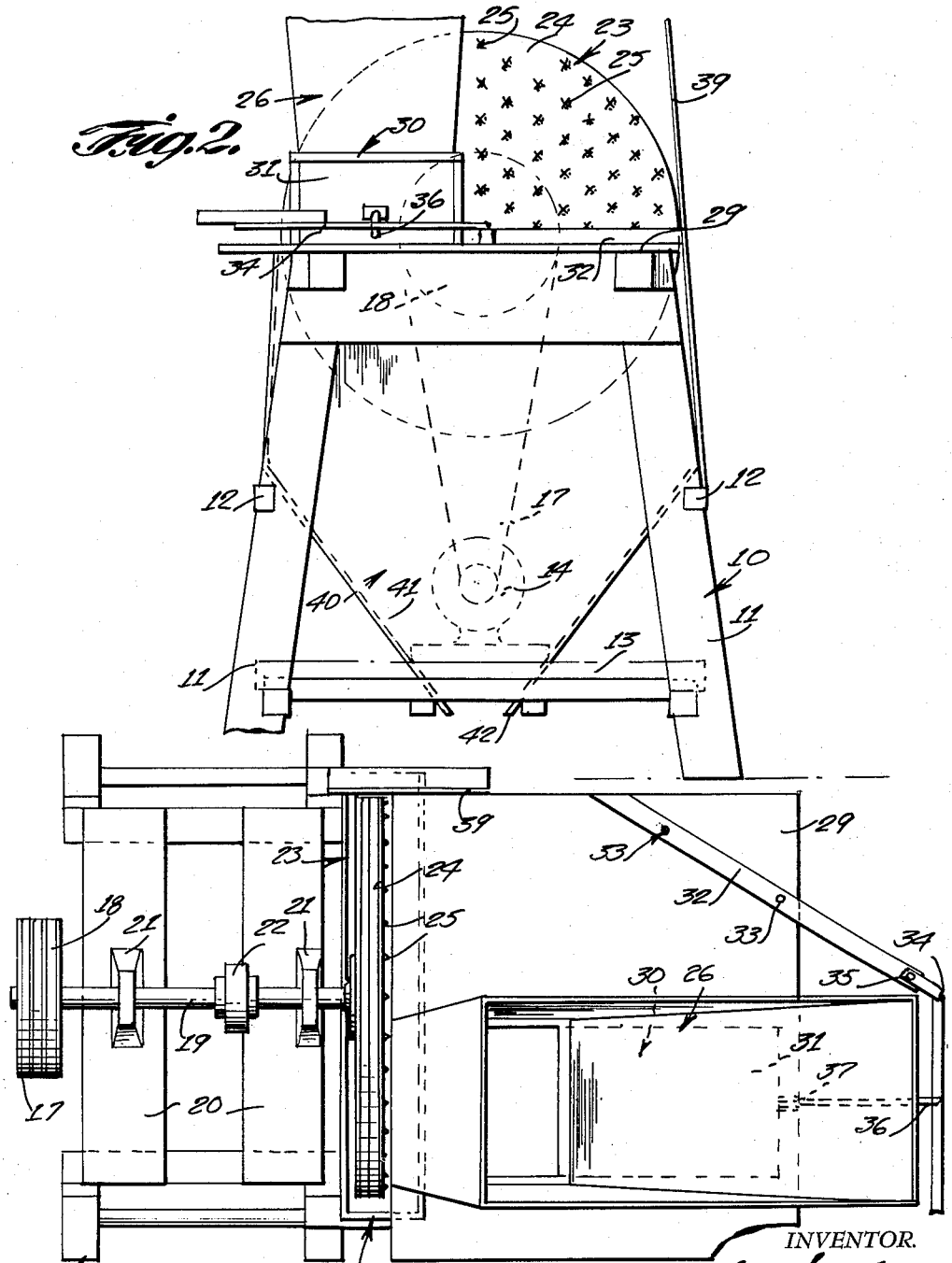
INVENTOR.
Ramón Ávila
BY
ATTORNEYS ём
United States Patent Office 2,962,234
Patented Nov. 29, 1960

2,962,234

GRATING AND SHREDDING MACHINE

Ramon Avila, R.F.D. No. Uno Box 33A,
Rio Piedras, Puerto Rico

Filed July 29, 1957, Ser. No. 674,728

5 Claims. (Cl. 241—278)

This invention relates to a grating and shredding machine, and more particularly to a machine or apparatus for grating and shredding coconuts.

The object of the invention is to provide a machine or apparatus which is adapted to be used for breaking up coconut shells so that the coconut shells can be converted into fibre, dust and the like.

Another object of the invention is to provide a machine which is especially suitable for use in grating or shredding various materials such as coconut shells or husks whereby the husks can be readily converted to fibres, dust and the like, so that the fibres and dust can be used for any desired purpose.

A further object of the invention is to provide a grating and shredding machine which is extremely simple and inexpensive to manufacture.

Other objects and advantages will be apparent during the course of the following description.

In the accompanying drawings, forming a part of this application, and in which like numerals are used to designate like parts throughout the same:

Figure 1 is an elevational view showing the grating and shredding machine of the present invention, and with parts broken away and in section.

Figure 2 is a view taken at right angles to the view shown in Figure 1.

Figure 3 is a top plan view of the grating and shredding machine of the present invention.

Referring in detail to the drawings, the numeral 10 designates a frame, and the frame 10 includes a plurality of upstanding legs 11 which have horizontally disposed braces 12 extending therebetween. Supported by the lower portion of the frame 10 is a horizontally disposed base 13, and mounted on the base 13 is a motor 14 which is adapted to be connected to a suitable source of electrical energy, in the usual manner. A shaft 15 is driven by the motor 14, and a pulley 16 is mounted on the shaft 15. Belts 17 are trained over the pulley 16, and the belts 17 are also trained over a pulley 18 on a shaft 19.

Extending across the upper portion of the frame 10 and secured thereto, is a pair of spaced parallel horizontally disposed beams 20, and bearings 21 extend upwardly from the beams 20. The bearings 21 and a bearing 22 serve to support the shaft 19. A rotary wheel 23 is connected to an end of the shaft 19, and the wheel 23 has a plate 24 secured thereto in any suitable manner, and extending outwardly from the plate 24 is a plurality of teeth or shredding elements 25.

Supported by the upper end of the frame 10 is a horizontally disposed platform 29, and arranged above the platform 29 is a hopper 26 which has its upper end open. The hopper 26 is adapted to be supplied with material to be grated such as the coconuts 27, Fig. 1, and the lower portion of the hopper 26 is open as at 28 whereby the coconuts 27 can be fed into the path of the moving teeth 25 whereby these coconuts 27 will be shredded or grated.

Supported by the platform 29 is a stationary housing 30, and the housing 30 communicates with the lower portion of the hopper 26. A plunger 31 is movably mounted in the housing 30, and the plunger 31 is adapted to be used for selectively pushing the coconuts 27 into the path of the moving teeth 25 of the rotary wheel 23. A manually operable means is provided for moving the plunger 31, and this means comprises a bar 32 which is secured to the platform 29 in any suitable manner, as for example by means of securing elements 33. A lever 34 which is adapted to be hand operated, is pivotally connected to an end of the bar 32 by means of a pivot pin 35. An arm 36 has one end connected to the lever 34, while the other end of the arm 36 is connected to a lug 37 which extends outwardly from the plunger 31, by means of a pin 38, Fig. 1.

Extending upwardly from the frame 10 and secured thereto is a vertically disposed baffle 39, and the baffle 39 can be used for deflecting the grated material down into a receiver which is indicated generally by the numeral 40. The receiver 40 includes angularly arranged wall members 41, and the lower end of the receiver 40 is open as at 42 so that the grated coconut shells can drop through the opening 42 into a suitable receptacle, or onto a conveyor or the like.

From the foregoing, it is apparent that there has been provided a machine or apparatus which is especially suitable for use in grating or shredding coconut shells or husks. In use, a plurality of the coconuts, such as the coconuts 27 are adapted to be arranged in the hopper 26, and then the motor 14 is actuated. As the motor 14 is actuated, it turns the shaft 15, and this rotates the pulley 16 which in turn causes movement of the endless belts 17. As the belts 17 turn, they turn the pulley 18 which is mounted on the shaft 19. The shaft 19 is supported by the bearings 21 and 22, and the shaft 19 is supported by the upper portion of the frame 10. As the shaft 19 rotates, it causes rotation of the wheel 23 to which it is connected. The wheel 23 has the plate 24 secured thereto, and a plurality of teeth or shredding elements 25 extend outwardly from the plate 24 and are secured thereto. The lower portion of the hopper 26 is provided with an opening or cutout 28 so that the coconuts 27 can move into the path of the rotating wheel 23. Thus, these coconuts will be shredded by the teeth 25 and the shredded coconut husks or shells will drop down into the receiver 40. The receiver 40 has its bottom open as at 42 whereby the ground coconut shells can be deposited into a suitable receptacle, or onto a conveyor or the like. When desired, the plunger 31 can be manually moved in order to push certain of the coconuts 27 into the path of the rotating wheel 23, and for manually moving the plunger 31, the manually operable lever 34 is provided. The lever 34 is pivotally connected to the bar 32 as at 35, and the arm 36 connects the lever 34 to the plunger 31 so that by moving the lever 34, the plunger 31 can be used for urging the coconuts 27 into the path of the rotating wheel 23.

The parts can be made of any suitable material and in different shapes or sizes.

The machine of the present invention can be used for producing a soil substitute by shredding the coconut shells 27. The machine can be used for processing other materials such as different tropical agricultural products. Coconut shells are tough and are extremely difficult to grate or shred. When coconut shells are grated or shredded, several products are obtained, and one of these products is similar to sawdust and can be used for starting small plants or the like in nurseries. Thus, such dust can be used as a packing material as for example for plants which are to be shipped from abroad or the like. Also, another product that is produced is in the form of fibres which can be used as a good packing material, The machine of the present invention will produce coir fibre and coir dust, that is by shredding the coconuts, the coir can be collected and this coir can be used for any different purpose as for example for making rope or the like. The husk of the coconut is surrounded by a fibre which is called coir and when the husk is defibred mechanically, two products are produced, namely, the coir fibre and the coir dust. Coir fibre can be used for making different products such as paper, twine, ropes, matting, door mats, mattresses, brooms, brushes, packing and the like. The coir dust can be used as a soil conditioner, potting material, packing, insulation, and the like.

Thus, it will be seen that there has been provided a machine which will break into fibres the outer shells of coconuts or other fibrous shells or plants by means of rotating teeth which are on the rotating wheel. The machine is operated by means of the motor 14 which transmits power to the wheel 23, and the piston or plunger 31 can be used for feeding coconuts into the path of the rotating wheel. The cutting wheel breaks the coconut shell into fibres and dust which can be used for different purposes such as a temporary material for growing ornamental plants, a heat insulator, and as a packing material or the like.

While I have shown a preferred form of my invention, I reserve all rights to such modifications as properly fall within the scope of the invention as claimed.

I claim:

1. In a shredding and grating apparatus, a frame, a horizontally disposed base secured to said frame, a motor supported by said base, a pair of horizontally disposed spaced parallel beams supported by said frame, a shaft extending transversely across said beams and supported thereabove, belt and pulley means connecting said motor to said shaft, a wheel connected to an end of said shaft, a plurality of spaced apart teeth extending from said wheel, a platform on the upper portion of said frame, a hopper arranged above said platform, there being an opening in the lower portion of said hopper adjacent said wheel, a receiver arranged below said wheel, the bottom of said receiver being open, a housing secured to said platform and communicating with said hopper, a plunger movably mounted in said housing and mounted for horizontal movement into and out of registry with the lower portion of said hopper, and manually operable means for moving said plunger.

2. In a shredding and grating apparatus, a frame, a horizontally disposed base secured to said frame, a motor supported by said base, a pair of horizontally disposed spaced parallel beams supported by said frame, a shaft extending transversely across said beams and supported thereabove, belt and pulley means connecting said motor to said shaft, a wheel connected to an end of said shaft, a plurality of spaced apart teeth extending from said wheel, a platform on the upper portion of said frame, a hopper arranged above said platform, there being an opening in the lower portion of said hopper adjacent said wheel, a receiver arranged below said wheel, the bottom of said receiver being open, a housing secured to said platform and communicating with said hopper, a plunger movably mounted in said housing and mounted for horizontal movement into and out of registry with the lower portion of said hopper, manually operable means for moving said plunger, said manually operable means comprising a bar secured to said platform, a manually operable lever pivotally connected to said bar, and an arm connecting said lever to said plunger.

3. In a shredding and grating apparatus, a frame including a plurality of upstanding legs, a plurality of horizontally disposed braces extending between said legs and secured thereto, a horizontally disposed base secured to said frame, a motor supported by said base, a pair of horizontally disposed spaced parallel beams supported by said frame, a shaft extending transversely across said beams and supported thereabove, belt and pulley means connecting said motor to said shaft, a wheel connected to an end of said shaft, a plurality of spaced apart teeth extending from said wheel, a platform on the upper portion of said frame, a hopper arranged above said platform, there being an opening in the lower portion of said hopper adjacent said wheel, a receiver arranged below said wheel, said receiver including angularly arranged wall members, the bottom of said receiver being open, a housing secured to said platform and communicating with said hopper, a plunger movably mounted in said housing and mounted for movement into and out of registry with the lower portion of said hopper, manually operable means for moving said plunger, said manually operable means comprising a bar secured to said platform, a manually operable lever pivotally connected to said bar, an arm connecting said lever to said plunger, and a baffle extending upwardly from said frame and arranged adjacent said wheel.

4. In a shredding and grating apparatus, a frame, a motor supported by said frame, a shaft supported by said frame, belt and pulley means connecting said motor to said shaft, a wheel connected to an end of said shaft, a plurality of spaced apart teeth extending from said wheel, a platform on the upper portion of said frame, a hopper arranged above said platform, there being an opening in the lower portion of said hopper adjacent said wheel, and a receiver arranged below said wheel, a housing secured to said platform and communicating with said hopper, a plunger movably mounted in said housing and mounted for horizontal movement into and out of registry with the lower portion of said hopper, and manually operable means for moving said plunger.

5. A shredding and grating apparatus comprising a frame, a motor supported by said frame, a shaft driven by said motor, a wheel connected to said shaft, a plurality of spaced apart teeth extending from said wheel, a platform on the upper portion of said frame, a hopper arranged above said platform, there being an opening in the lower portion of said hopper adjacent said wheel, a receiver arranged below said wheel, said receiver including angularly arranged wall members, the bottom of said receiver being open, a housing secured to said platform and communicating with said hopper, a plunger movably mounted in said housing and mounted for horizontal movement into and out of registry with the lower portion of said hopper, manually operable means for moving said plunger, said manually operable means comprising a bar secured to said platform, a manually operable lever pivotally connected to said bar, an arm connecting said lever to said plunger, and a baffle extending upwardly from said frame and arranged adjacent said wheel.

References Cited in the file of this patent

UNITED STATES PATENTS

| | | |
|---|---|---|
| 24,052 | Pratt | May 11, 1859 |
| 619,012 | Davis | Feb. 7, 1899 |
| 953,790 | Meseraull | Apr. 5, 1910 |
| 1,251,612 | Zanvettor | Jan. 1, 1918 |
| 1,348,659 | Nicholson | Aug. 3, 1920 |
| 2,075,522 | Hughes | Mar. 30, 1937 |
| 2,477,198 | Murray | July 26, 1949 |

FOREIGN PATENTS

| | | |
|---|---|---|
| 37,320 | Switzerland | Aug. 28, 1906 |
| 321,752 | Italy | Oct. 16, 1934 |